US012607219B1

(12) United States Patent
Lin et al.

(10) Patent No.: US 12,607,219 B1
(45) Date of Patent: Apr. 21, 2026

(54) ROLLER SCREW BIDIRECTIONAL AND ALTERNATED PRELOADING STRUCTURE WITH BUILT-IN METAL SPRINGS

(71) Applicant: FOSITEK CORPORATION, New Taipei City (TW)

(72) Inventors: Chun-Han Lin, New Taipei City (TW); Yung-Chih Tseng, New Taipei City (TW); Zoen Ryon Ryan Wong, New Taipei City (TW); Po-Yun Chen, New Taipei City (TW)

(73) Assignee: FOSITEK CORPORATION, New Taipei City (TW)

( * ) Notice: Subject to any disclaimer, the term of this patent is extended or adjusted under 35 U.S.C. 154(b) by 0 days.

(21) Appl. No.: 19/261,495

(22) Filed: Jul. 7, 2025

(30) Foreign Application Priority Data

Jun. 4, 2025    (TW) ................................. 114120948

(51) Int. Cl.
*F16B 37/12*        (2006.01)
*F16H 25/22*        (2006.01)
(52) U.S. Cl.
CPC ......... *F16B 37/12* (2013.01); *F16H 25/2252* (2013.01); *F16H 2025/2257* (2013.01)
(58) Field of Classification Search
CPC ..................... F16H 25/2252; F16H 2025/2257
See application file for complete search history.

(56) References Cited

U.S. PATENT DOCUMENTS

| | | | | |
|---|---|---|---|---|
| 4,884,466 | A | * | 12/1989 | Duruisseau ......... F16H 25/2252 |
| | | | | 74/424.92 |
| 12,535,124 | B1 | * | 1/2026 | Wu ..................... F16H 25/2252 |
| 2020/0049239 | A1 | * | 2/2020 | Hoover ............... F16H 25/2252 |

FOREIGN PATENT DOCUMENTS

| | | | | |
|---|---|---|---|---|
| CN | 110735897 | A | 1/2020 | |
| CN | 112013090 | A | 12/2020 | |
| CN | 112032267 | A * | 12/2020 | ......... F16H 25/2266 |
| CN | 213575395 | U | 6/2021 | |
| CN | 118066269 | A | 5/2024 | |
| DE | 102014214137 | A1 * | 1/2015 | ......... F16H 25/2252 |
| DE | 102019124284 | A1 * | 3/2021 | ......... F16H 25/2252 |

(Continued)

OTHER PUBLICATIONS

Search Report dated Oct. 28, 2025 issued by Taiwan Intellectual Property Office for counterpart application No. 114120948.

*Primary Examiner* — William C Joyce

(74) *Attorney, Agent, or Firm* — Demian K. Jackson; Jackson IPG PLLC

(57) ABSTRACT

A roller screw bidirectional and alternated preloading structure includes a screw, a nut fitted around the screw, a roller unit including first and second rollers alternately arranged between and meshing with the screw and the nut, two preload maintaining units located at two ends of the roller unit and respectively including a retainer including retaining holes for receiving locating ends of the rollers and a metal spring including circumferentially spaced elastic protrusions tilted toward the roller unit and radially offset from the retaining holes, and a retaining unit. Gaps are formed between bottoms of the retaining holes and the locating ends, while the elastic protrusions are pressed against and elastically deformed by pointed ends of the rollers to create two opposite preloads alternately applied to the first and second rollers from two directions. This structure compensates fitting gaps and enables increased transmission accuracy and motion stability of the roller screw.

5 Claims, 12 Drawing Sheets

(56)     References Cited

FOREIGN PATENT DOCUMENTS

TW             M676481  U     11/2025
WO     WO-2011113724  A1  *   9/2011   .........  F16H 25/2006

* cited by examiner

ROLLER SCREW BIDIRECTIONAL AND ALTERNATED PRELOADING STRUCTURE WITH BUILT-IN METAL SPRINGS

This application claims the priority benefit of Taiwan patent application number 114120948 filed on Jun. 4, 2025, the disclosure of which is hereby incorporated by reference in its entirety.

FIELD OF THE INVENTION

The present invention relates to a transmission assembly, and more particularly, to a roller screw bidirectional and alternated preloading structure with built-in metal springs, which can create two directionally opposite axial preloads on two groups of rollers to increase the rolling stability of the rollers.

BACKGROUND OF THE INVENTION

The planetary roller screw transmission assembly, also briefly referred to as the planetary roller screw, has high load carrying capability, high rigidity, excellent transmission efficiency, and high locating accuracy, and is accordingly, widely applied to the fields involving precision machine tools, servo drive systems, aerospace control devices, and high-performance robots that require quick response and high dynamic performance. A fundamental structure of the planetary roller screw transmission device includes a plurality of rollers arranged around a screw and located between the screw and a nut, such that the rollers are in rolling engagement with the screw and the nut simultaneously. With these arrangements, a rotational motion can be converted to a linear motion for driving an external load.

As shown in FIG. 1A, a common planetary roller screw transmission device includes a screw 11, a nut 12, a plurality of rollers 13, and a plurality of retainer units 14. The screw 11 has a thread structure provided on an outer surface thereof. The nut 12 defines an inner bore 120 for receiving the rollers 13 therein. The nut 12 has annular teeth 12$t$ formed on around an inner wall surface thereof for meshing and forming a rolling contact with annular teeth formed on around the outer surfaces of the rollers 13. The retainer units 14 are provided at two axially outer ends of the rollers 13 to hold the rollers 13 between the screw 11 and the nut 12 as well as maintain the rollers 13 at circumferentially spaced positions.

However, the above described conventional planetary roller screw transmission device has many disadvantages in practical operation thereof. As shown in FIGS. 1B and 1C, a highly precise geometrical match should exist between the rollers 13 and the screw 11 and the nut 12. Any tolerance in manufacturing or error in assembling would form a minor gap G between the rollers 13 and the screw 11 and the nut 12, such that the positions on the rollers 13 that actually contact the screw 11 and the nut 12 are offset from the designed pitch circle radius. In the event the fitting gap G is not effectively compensated, there would not be sufficient frictional force between the rollers 13 and the nut 12 when the planetary roller screw transmission device operates. As a result, the rollers 13 will skid or idle relative to the nut 12 and can rarely keep a pure rolling contact and sliding friction with the nut 12. The skidding or idling rollers 13 are subjected to a relatively high wear and reduced structural life. Similarly, there might be insufficient contact between the rollers 13 and the screw 11 to cause skidding of the rollers 13 relative to the screw 11, which would adversely prevent the planetary motion from slowing down or advancing properly and accordingly, reduced linear push efficiency and locating accuracy.

Although the retainer units 14 are used in the conventional planetary roller screw transmission device to limit the end sections of the rollers 13 and control the radial spacing of the rollers 13, the retainer units 14 provide only a mechanically locating function without the ability to provide preload compensation or guide the rollers to different directions of motion. The retainer units 14 could not effectively overcome the problems of skidding and off setting rollers 13 caused by the gap G between the rollers 13 and the screw 11 and the nut 12.

Therefore, it is important to effectively increase the stable contact between the rollers 13 and the nut 12 and enhance the rolling engagement of the rollers 13 with the screw 11 to ensure the stability of the rolling motion among the screw 11, the rollers 13 and the nut 12 without increasing the structural complexity and manufacturing cost of the planetary roller screw transmission device.

SUMMARY OF THE INVENTION

A primary object of the present invention is to overcome the above technical problems by providing a roller screw bidirectional and alternated preloading structure with built-in metal springs to effectively compensate fitting gaps formed by machining errors. With the present invention, two directionally opposite axial preloads are applied to two groups of rollers, which are alternately arranged around a screw, to achieve stable rolling contact effect in two directions, so as to enable upgraded overall transmission efficiency, reduced wear loss, and extended service life.

To achieve the above and other objects, the roller screw bidirectional and alternated preloading structure with built-in metal springs according to a first embodiment of the present invention includes a screw, a nut, two preload maintaining units, and a retaining unit. The screw has a thread structure provided on an outer surface thereof; and the nut is fitted around the screw and has at least one annular grooved zone and two limiting grooves provided on an inner wall surface thereof.

The roller unit is fitted in the nut and located between the screw and the nut. The roller unit includes a plurality of first rollers and a plurality of second rollers, which are alternately located around the screw and respectively have a plurality of annular teeth provided on around an outer surface thereof for meshing with the thread structure on the screw and the at least one annular grooved zone in the nut. The first rollers respectively have a first locating end and a first pointed end, and the second rollers respectively have a second locating end and a second pointed end.

The two preload maintaining units are provided at two axially outer ends of the roller unit. Each of the preload maintaining units includes a retainer and a metal spring. The retainer of a first one of the two preload maintaining units has a plurality of retaining holes provided thereon for receiving the first locating ends, and the retainer of a second one of the two preload maintaining units has a plurality of retaining holes provided thereon for receiving the second locating ends. Each of the metal springs is formed with a plurality of elastic protrusions, which are circumferentially spaced along and radially inward extended from an inner sidewall surface of the metal spring to axially tilt toward the roller unit. The elastic protrusions are located radially offset from the retaining holes; and the elastic protrusions of the metal spring on the second and the first metal spring are elastically pressed against the first pointed ends and the second pointed ends, respectively.

The retaining unit includes two retaining members located at two axially outer sides of the two preload maintaining units. The two retaining members are separately fitted in the two limiting grooves in the nut to fix the two preload maintaining units in place and prevent them from axially moving out of the nut.

When the present invention is in a fully assembled state, a first gap is formed between each first locating end and a bottom of one corresponding retaining hole formed on the retainer of the first preload maintaining unit, and the first pointed ends are pressed against the elastic protrusions on the metal spring of the second preload maintaining unit to elastically deform the elastic protrusions; and a second gap is formed between each second locating end and a bottom of one corresponding retaining hole formed on the retainer of the second preload maintaining unit, and the second pointed ends are pressed against the elastic protrusions on the metal spring of the second preload maintaining unit to elastically deform the elastic protrusions.

Since the first and the second pointed ends are separately pressed against the elastic protrusions on the two metal springs to deform the elastic protrusions and the first and the second gaps are formed at two ends of the roller unit and alternately arranged around the screw, two directionally opposite axial preloads applied by the deformed elastic protrusions of the two metal springs are transmitted via the first and the second pointed ends to the first and the second rollers, respectively. Therefore, a bidirectional and circumferentially alternated preloading effect can be achieved to effectively eliminate any backlash between the screw and the nut and to keep pure rolling contact of the rollers with the thread structure on the screw and the annular grooved zones in the nut.

The metal spring and the retainer of each preload maintaining unit are removably assembled to each other to facilitate convenient maintenance and replacement. Of course, the metal spring and the retainer can be otherwise integrally formed as a single member to achieve simplified assembling procedures and reduced number of components.

With the above structural design, the present invention can effectively compensate any fitting gap formed by machining and assembling errors, prevent the rollers from skidding and deviation during dynamic motions, reduce wear loss, and upgrade accuracy in motion. The bidirectional and alternated preloading structure of the present invention can increase the stability and fitness of the rollers in two opposite axial directions, which in turn ensures excellent accuracy and reliability of the transmission system operating in a high load and highly dynamic state.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
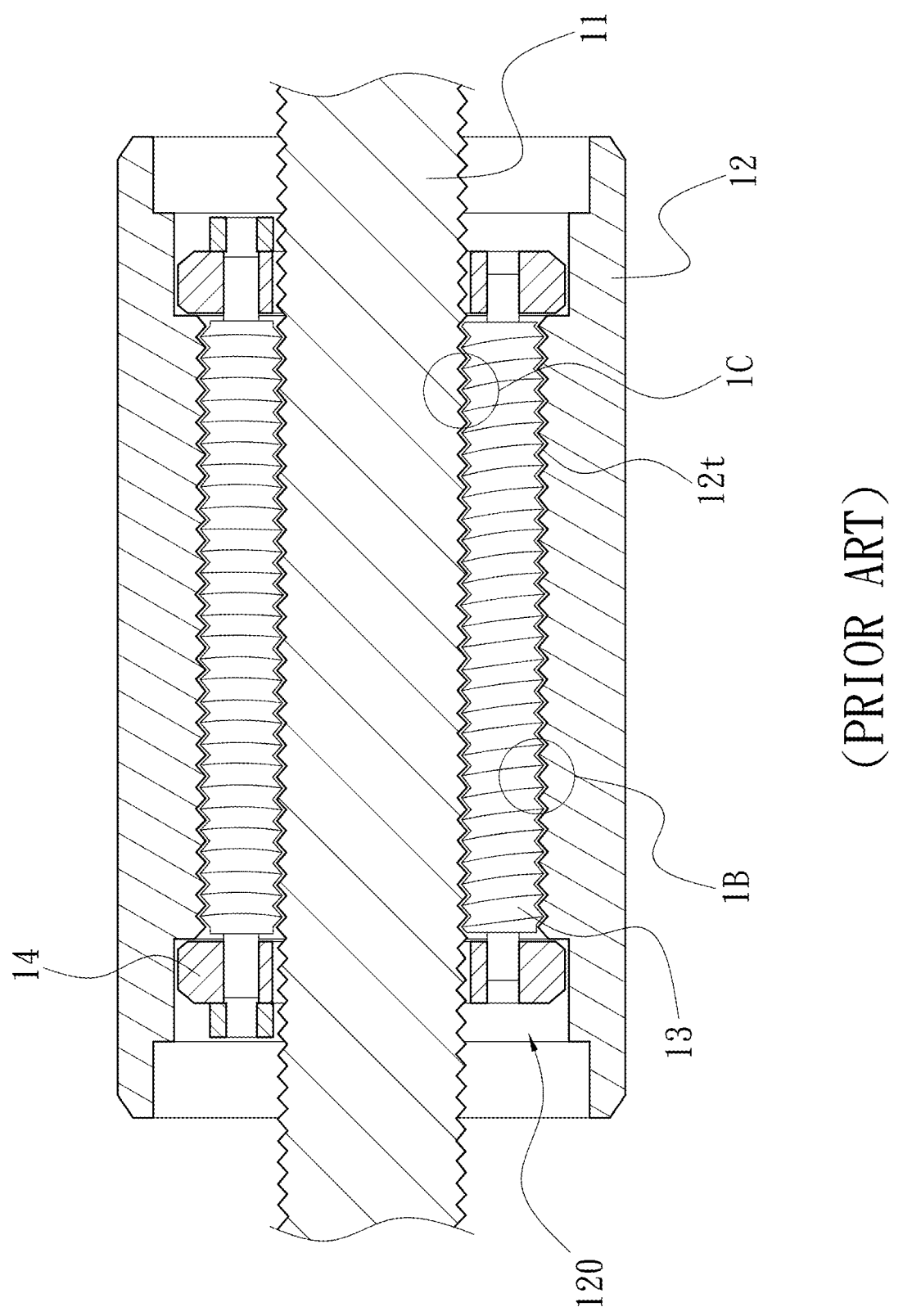
FIG. 1A is a sectional side view showing the structure of a conventional planetary roller screw transmission device, which includes a plurality of rollers, a nut, and a screw.
Figure 1C:
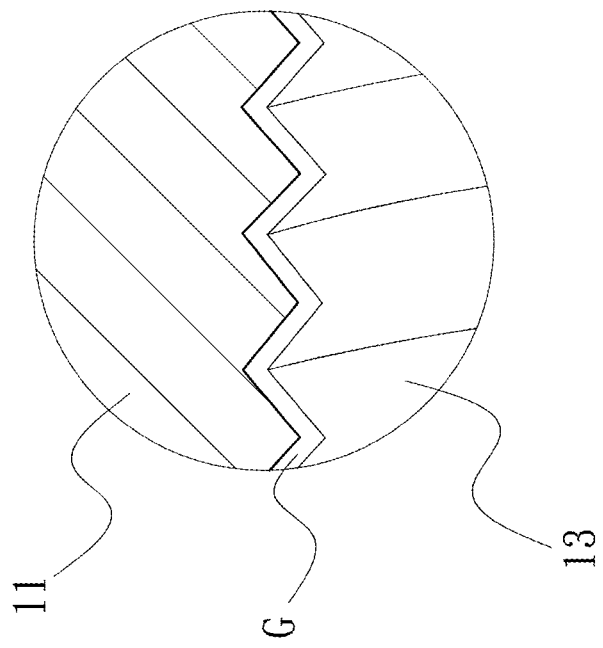
FIG. 1C shows the roller and the screw in the planetary roller screw transmission device of FIG. 1A mesh with each other.
Figure 1B:
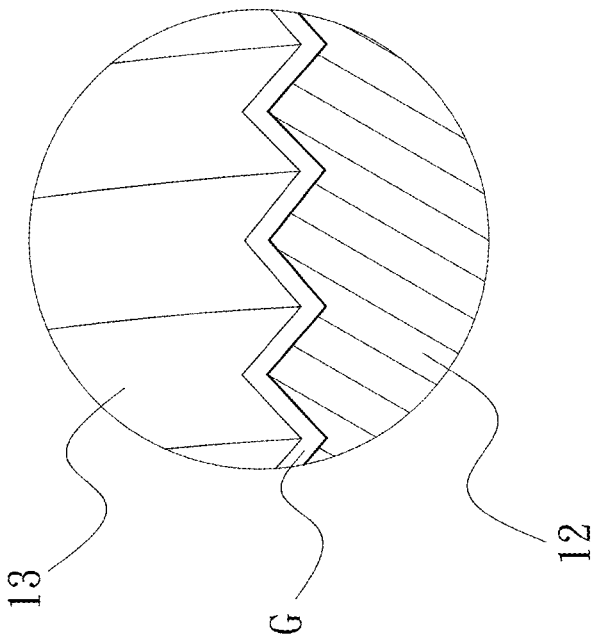
FIG. 1B shows the roller and the nut in the planetary roller screw transmission device of FIG. 1A mesh with each other.
Figure 2:
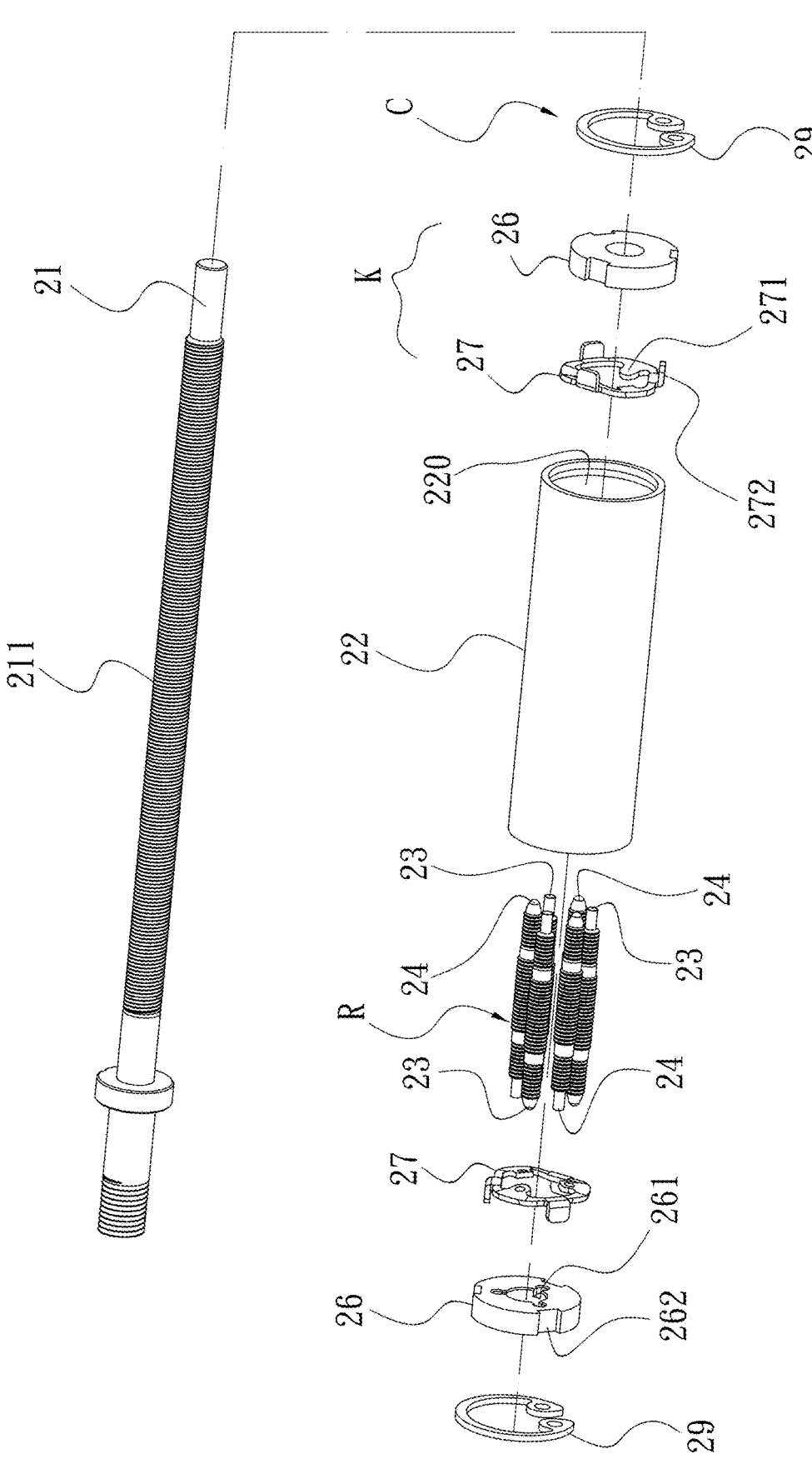
FIG. 2 is an exploded perspective view of a roller screw bidirectional and alternated preloading structure with built-in metal springs according to a first embodiment of the present invention.

The present invention will now be described with some preferred embodiments thereof and by referring to the accompanying drawings. For the purpose of easy to understand, elements that are the same in the preferred embodiments are denoted by the same reference numerals.

The structure, functions, and technical features of a roller screw bidirectional and alternated preloading structure with built-in metal springs according to different embodiments of the present invention will be described with reference to the accompanying drawings. Please refer to FIGS. 2, 3A to 3D, 4, and 5A to 5B. The roller screw bidirectional and alternated preloading structure with built-in metal springs according to a first embodiment of the present invention includes a screw 21, a nut 22, a roller unit R, two preload maintaining units K, and a retaining unit C.

The nut 22 is a hollow cylindrical member internally defining an axially extended inner bore 220 having two open ends. The nut 22 includes two annular grooved zones 221 provided around an inner wall surface of the inner bore 220 for meshing engagement with the roller unit R. The annular grooved zones 221 provide annular guiding paths and contact limitation for the roller unit R to perform stable planetary rolling in the nut 22 without the risk of moving axially out of the nut 22. Each of the two annular grooved zones 221 includes a plurality of annular grooves 221g. Two limiting grooves 222 are provided in the nut 22 near two end portions of the inner wall surface that do not provided any grooves.

The nut 22 further includes a radially recessed avoiding zone 223 formed on the inner wall surface between the two annular grooved zones 221. The avoiding zone 223 has an inner diameter larger than that of other portions of the inner bore 220 to provide sufficient space to avoid interference of the roller unit R with the inner wall surface of the nut 22.

The screw 21 is an elongated rod-like member, such as an elongated round shaft, which is coaxially located in the nut 22 to axially extend through the inner bore 220. The screw 21 has at least one end extended to an outer side of the nut 22 for connecting with a driving device or for installing on an external mechanism. The screw 21 is provided on an outer surface with a thread structure 211 (i.e. a spiral groove or a spiral tooth). The thread structure 211 may be a multi-start thread structure. In practical application of the present invention, the screw 21 may be driven by an external power source to rotate (not shown). The screw 21 meshes with the roller unit R via the thread structure 211, such that the roller unit R spins between the screw 21 and the nut 22 while it revolves around the screw 21. With this dynamic mechanism, a rotational motion of the screw 21 is converted to an axial linear motion of the nut 22 to thereby achieve a linear push effect in high efficiency and high accuracy.

Please refer to FIGS. 2, 3A to 3C, and 4. The roller unit R is fitted in the inner bore 220 of the nut 22 and is located between the nut 22 and the screw 21. The roller unit R includes a plurality of first rollers 23 and second rollers 24. The first rollers 23 and the second rollers 24 are alternately located around and radially equally spaced along the outer surface of the screw 21. In the illustrated first embodiment, there are shown three pieces of first rollers 23 and three pieces of second rollers 24, which are correspondingly provided around the screw 21 at different angular positions and in rolling engagement with the corresponding thread structure 211. With this arrangement, the roller unit R can be driven by the screw 21 to perform the planetary rolling between the screw 21 and the nut 22.

The first rollers 23 and the second rollers 24 are axially extended cylindrical posts with a plurality of annular teeth 23$t$, 24$t$ formed around respective outer circumferential surface for meshing with structures correspondingly formed on the screw 21 and the nut 22. Specifically, each first roller 23 and each second roller 24 are axially divided into at least one first meshing section 231, 241 and at least one second meshing section 232, 242. The first meshing sections 231, 241 have a diameter larger than that of the second meshing sections 232, 242. The annular teeth 23$t$, 24$t$ in the first meshing sections 231, 241 are used in rolling engagement with the thread structure 211 of the screw 21, and the annular teeth 23$t$, 24$t$ in the second meshing sections 232, 242 are used in rolling engagement with the annular grooves 221$g$ in the annular grooved zones 221 of the nut 22.0

Figure 3A:
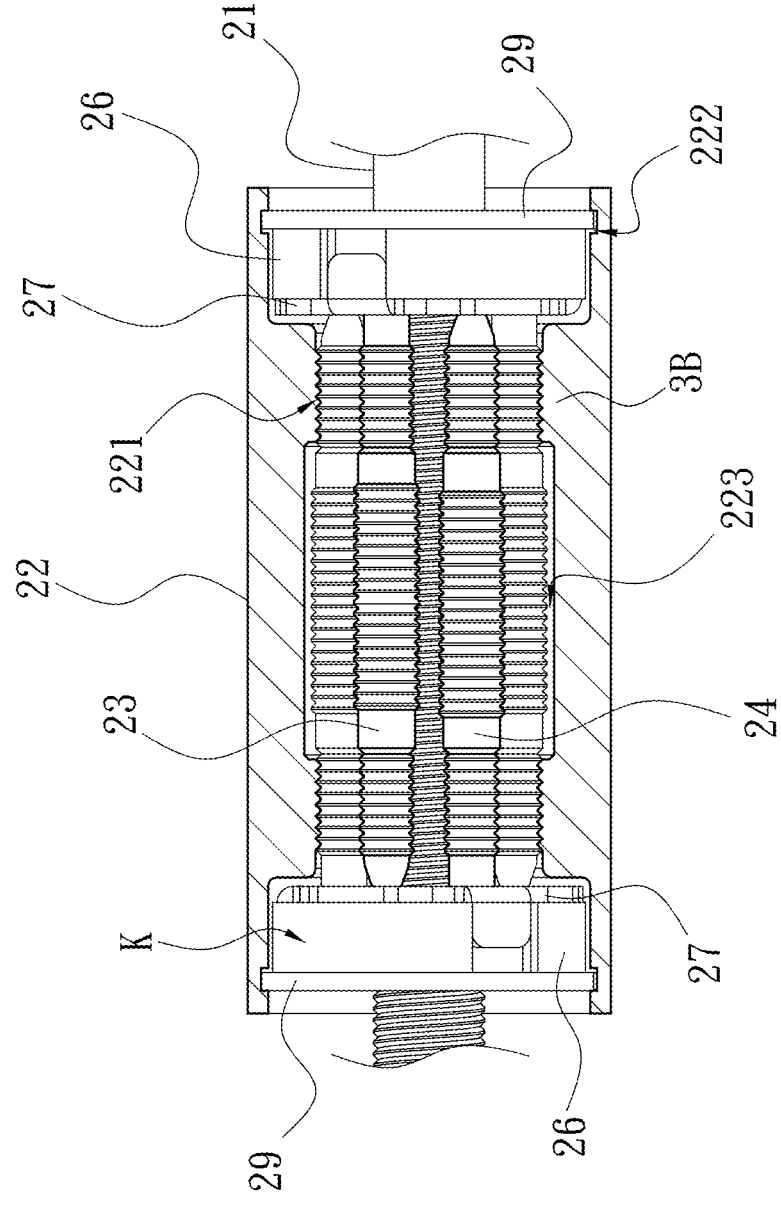
FIG. 3A is an assembled sectional side view of the first embodiment of the present invention.
Figure 3B:
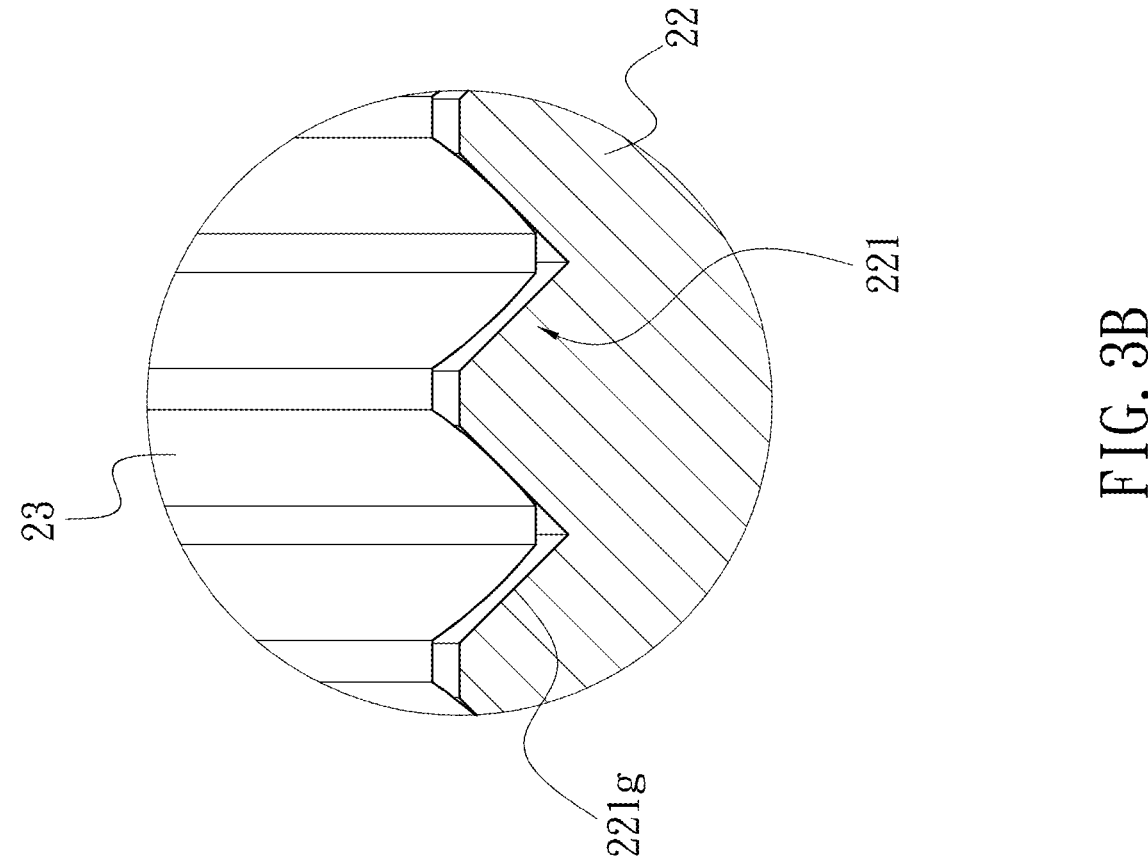
FIG. 3B is a locally enlarged view of FIG. 3A.
Figure 3C:
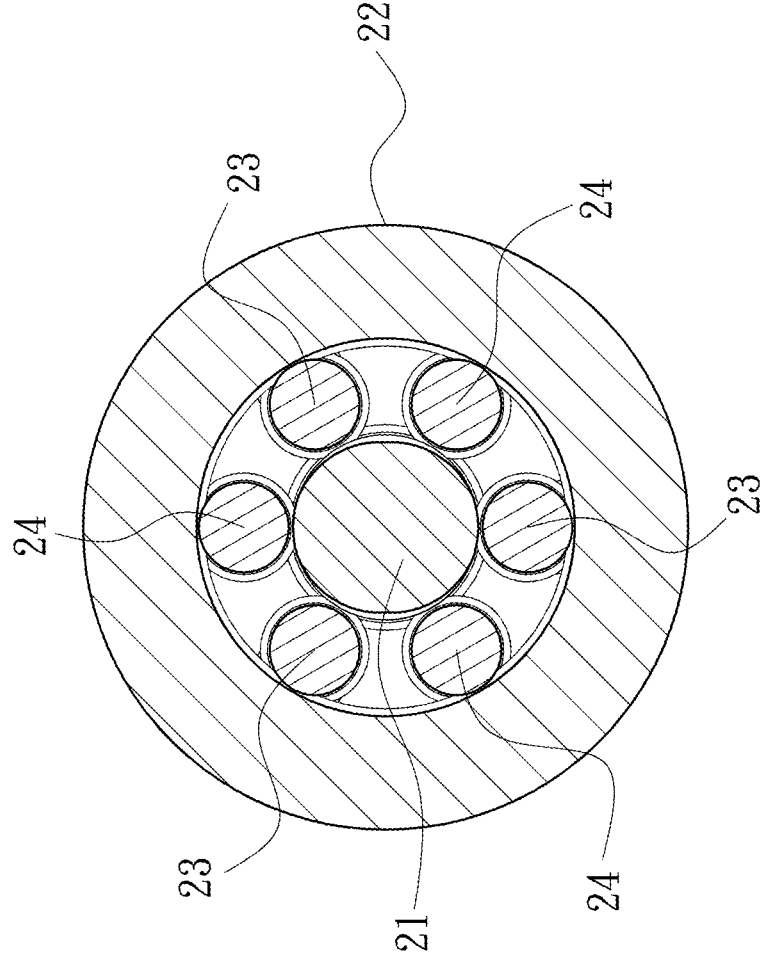
FIG. 3C is a sectional view of FIG. 3A, when viewing from a right end thereof.
Figure 3D:
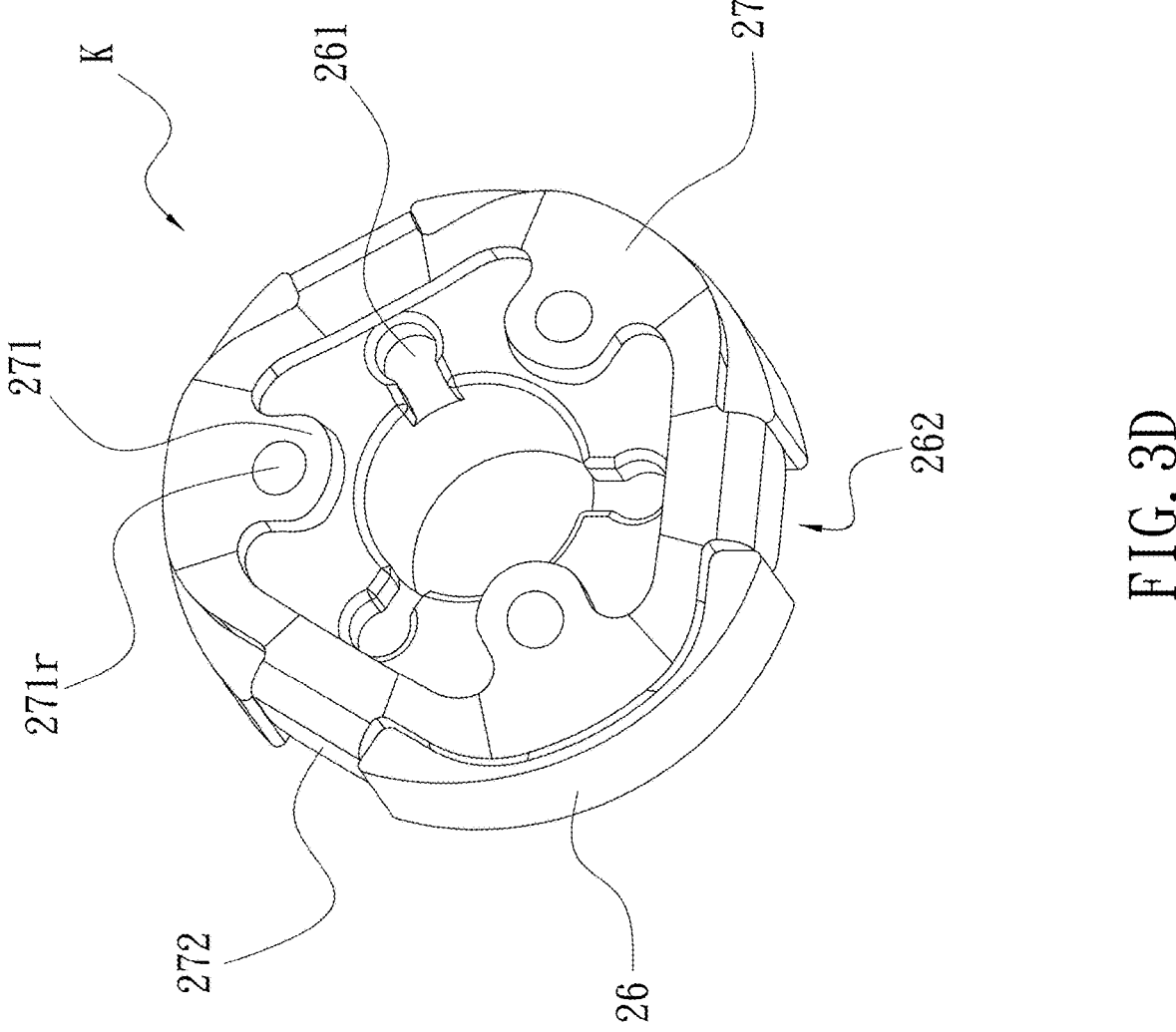
FIG. 3D is a perspective view of a preload maintaining unit used in the first embodiment of the present invention.
Figure 4:
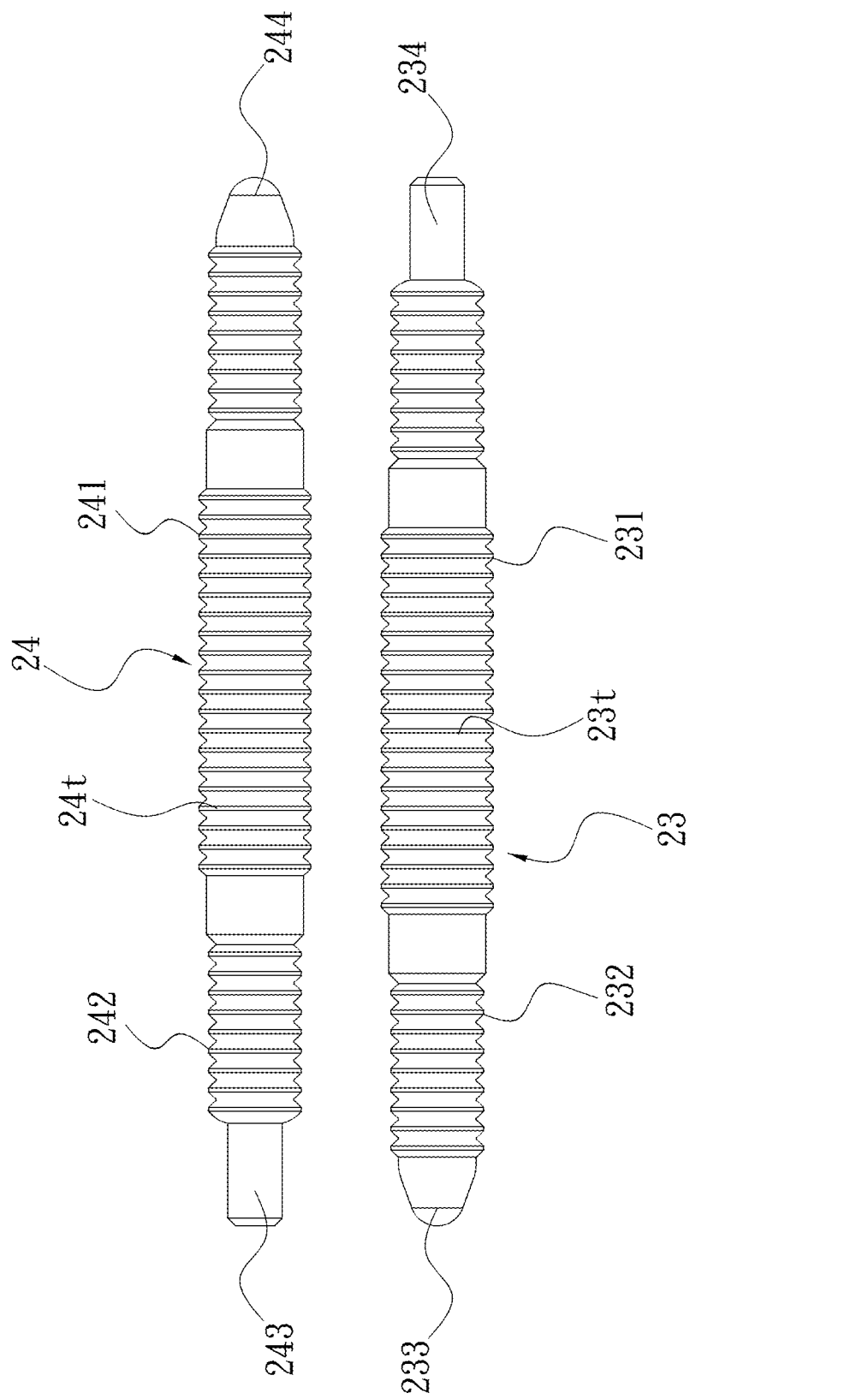
FIG. 4 shows a first roller and a second roller included in the first embodiment of the present invention.

As shown in FIGS. 3A and 4, the first meshing sections 231, 241 are located at a middle portion of the first rollers 23 and the second rollers 24, respectively. The second meshing section 232 is formed at each of two end portions of the first roller 23 located axially outside two ends of the first meshing section 231. Similarly, the second meshing section 242 is formed at each of two end portions of the second roller 24 located axially outside two ends of the first meshing section 241. With these arrangements, the first rollers 23 and the second rollers 24 respectively have two diametrically opposite sides in rolling engagement with the screw 21 and the nut 22 at the same time. Further, to avoid interference of the first meshing sections 231, 241 with the inner wall surface of the nut 22, the first meshing sections 231, 241 are located corresponding to the avoiding zone 223 formed on the inner wall surface of the nut 22. The avoiding zone 223 provides sufficient radial space, such that the first meshing sections 231, 241 of the first and the second rollers 23, 24, respectively, are in contact and rolling engagement with the screw 21 only.

Each of the first rollers 23 has two opposite outermost ends, one of which is a first pointed end 233 and the other one of which is a first locating end 234. Each of the second rollers 24 has two opposite ends, one of which is a second locating end 243 and the other one of which is a second pointed end 244. In the illustrated first embodiment, the first pointed end 233 and the first locating end 234 are located at a left and a right end of the first roller 23, respectively; and the second locating end 243 and the second pointed end 244 are located at a left and a right end of the second roller 24, respectively. The first and the second pointed end 233, 244 may be conical in shape.

Please refer to FIGS. 2, 3A, 3D, 4, and 5A to 5B. The two preload maintaining units K are provided at two ends of the roller unit R. Each of the preload maintaining unit K includes a retainer 26 and a metal spring 27. Each retainer 26 is provided with a plurality of retaining holes 261 and a plurality of fitting recesses 262. The retaining holes 261 are radially spaced along an inner sidewall surface of the retainer 26 for receiving corresponding first locating ends 234 and second locating ends 243 to fix the circumferentially spaced intervals of the first and the second rollers 23, 24. The fitting recesses 262 are spaced along a peripheral wall surface of the retainer 26. Each metal spring 27, which can be a loop-shaped leaf spring, is located between the roller unit R and an axially inner side of the retainer 26 and is formed with a plurality of elastic protrusions 271, which are circumferentially spaced along and radially inward extended from, for example, an inner sidewall surface of the metal spring 27 to axially tilt toward the roller unit R. The number of the elastic protrusions 271 of the metal spring 27 is the same as that of the first rollers 23 or the second rollers 24. For example, there are three elastic protrusions 271 corresponding to three first or three second rollers 23, 24; and the elastic protrusions 271 are located circumferentially corresponding to the first or the second rollers 23, 24, so as to ensure that the same preload can be evenly applied by the metal springs 27 to each of the first and second rollers 23, 24. Before the present invention is fully assembled, the elastic protrusions 271 are not subjected to any force and accordingly, are in the axially tilted state and located radially offset from the retaining holes 261. The elastic protrusions 271 in the axially tilted state before the present invention is assembled is helpful in providing effective elastic preloads after the present invention is assembled because forces from the tilted elastic protrusions 271 can be evenly applied to the first and second rollers 23, 24 for them to roll more stably. The metal spring 27 further includes a plurality of fitting legs 272 spaced along an outer periphery thereof for correspondingly engaging with the fitting recesses 262 formed on the retainer 26. With these arrangements, the metal spring 27 can be removably assembled to the retainer 26 to form the preload maintaining unit K. However, it is understood the present invention is not necessarily limited to the first embodiment. In other operable embodiments, the retainer 26 and the metal spring 27 may be otherwise integrally formed as a single member.

Figure 5A:
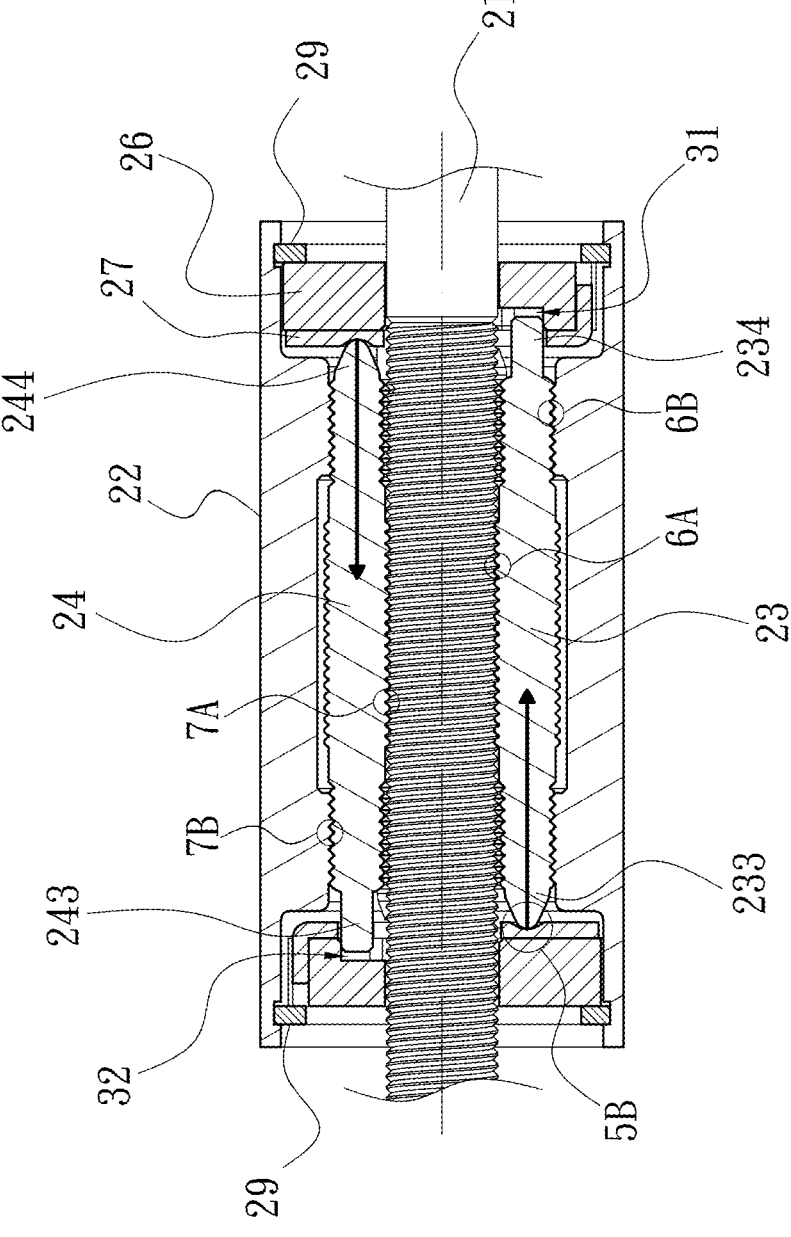
FIG. 5A is a sectional side view showing two directionally opposite axial preloads are created on the first and the second rollers by two preload maintaining units provided at two ends of the roller unit.
Figure 5B:
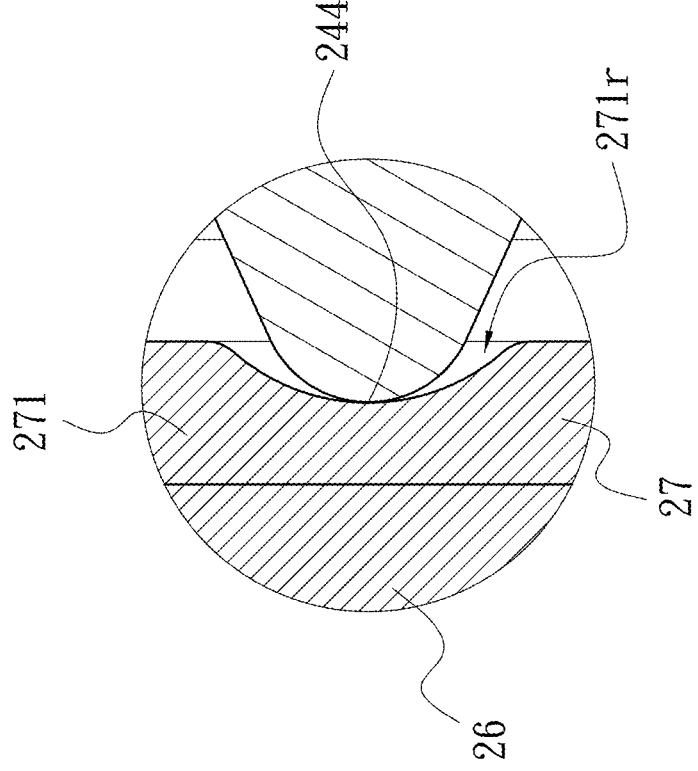
FIG. 5B is an enlarged view of the circled area of FIG. 5A for showing a concave recess formed on each of the preload maintaining units.

Further, the elastic protrusions 271 respectively have a free end, at where a recess 271$r$ is provided. The first pointed ends 233 and the second pointed ends 244 are pressed against the recesses 271$r$ on the elastic protrusions 271 of the left and the right preload maintaining unit K, respectively. The recesses 271$r$ can be concave recesses, as shown in FIG. 5B, or conic recesses. In the case of conic recesses 271$r$, the first pointed ends 233 and the second pointed ends 244 are in point contact with the recesses 271$r$, which is helpful in providing the first and the second rollers 23, 24 with sufficient locating function and concentrated preload transmission, and enables largely reduced friction area between the elastic protrusions 271 and the first and second rollers 23, 24, such that the first and second rollers 23, 24 can have increased rotational efficiency.

The retaining unit C includes two retaining members 29, such as two C-rings or two O-rings, which are separately located at two axially outer sides of the two preload maintaining units K and fitted in the two limiting grooves 222 formed around the inner wall surface of the nut 22 to thereby limit the two preload maintaining units K from moving axially out of the nut 22 during operation of the roller screw.

As shown in FIGS. 2, 3A, 4, and 5A to 5B, when the roller screw bidirectional and alternated preloading structure with built-in metal springs is in a fully assembled state, a first gap 31 is formed between each first locating end 234 of the first rollers 23 and a bottom of each corresponding retaining hole 261 on the retainer 26 of the right preload maintaining unit K, and the first pointed ends 233 are pressed against the elastic protrusions 271 of the metal spring 27 of the left preload maintaining unit K to limit and elastically deform the elastic protrusions 271 of the left metal spring 27. Similarly, a second gap 32 is formed between each second locating end 243 of the second rollers 24 and a bottom of each corresponding retaining hole 261 on the retainer 26 of the left preload maintaining unit K, and the second pointed ends 244 are pressed against the elastic protrusions 271 of the metal spring 27 of the right preload maintaining unit K to limit and elastically deform the elastic protrusions 271 of the right metal spring 27. When the first pointed ends 233 and the second pointed ends 244 are pressed against the left and the right metal spring 27, respectively, they are in point contact with the recesses 271r and cause elastic deformation of the elastic protrusions 271, while the first gaps 31 and the second gaps 32 are formed at two opposite ends of the roller unit R and alternately arranged around the screw 21. With these arrangements, the left and the right metal spring 27 can apply two directionally opposite axial preloads on the first and the second rollers 23, 24 to realize the roller screw bidirectional and alternated preloading structure with built-in metal springs according to the present invention and achieve control of selective direction of preload transmission.

Figure 6B:
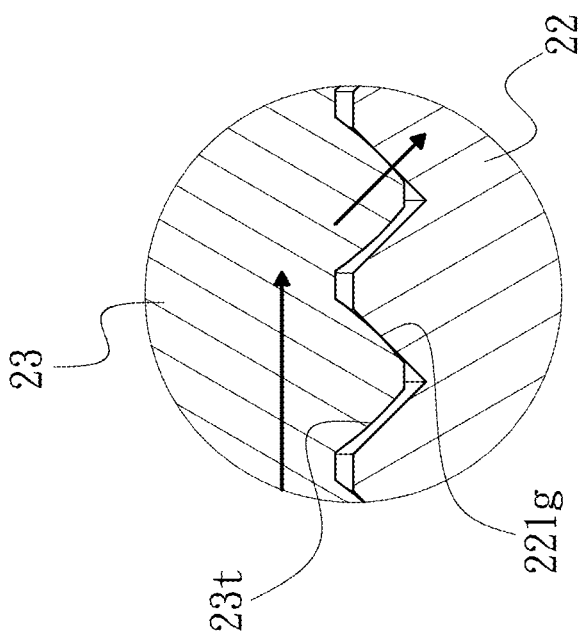
FIGS. 6A and 6B show the second rollers in the first embodiment of the present invention are pushed rightward.
Figure 6A:
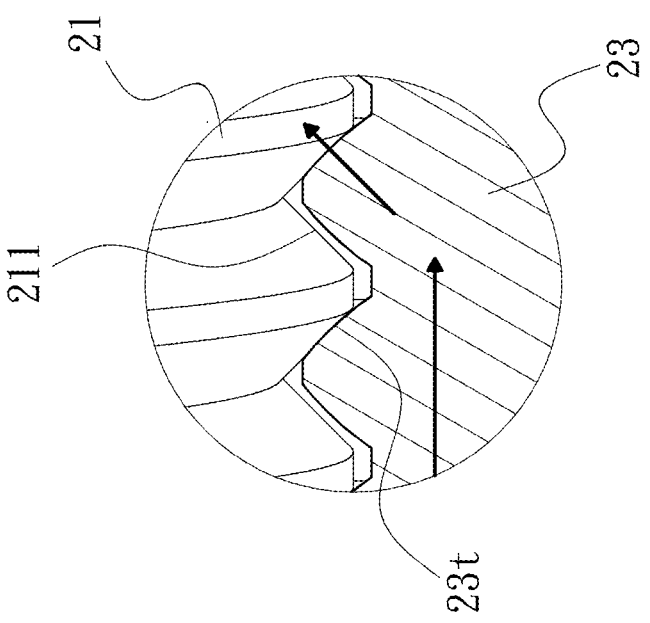

As shown in FIGS. 6A and 6B, the preload applied by the elastic protrusions 271 of the left metal spring 27 (see FIG. 5A) is transmitted via the first pointed ends 233 to the first rollers 23. Meanwhile, the first gaps 31 formed between the first locating ends 234 and the right retainer 26 allow the first rollers 23 to be pushed rightward by the elastic protrusions 271 of the left metal spring 27. In this manner, the annular teeth 23t are moved to contact a left side of the thread structure 211 of the screw 21 and a left side of the annular grooves 221g of the nut 22, such that the first rollers 23 are in stable engagement with the screw 21 and the nut 22 without skidding and idling between the screw 21 and the nut 22.

Figure 7B:
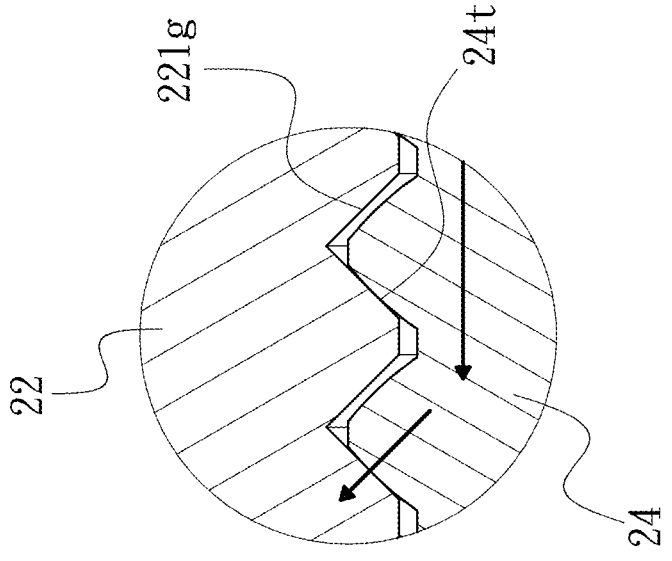
FIGS. 7A and 7B show the first rollers in the first embodiment of the present invention are pushed leftward.
Figure 7A:
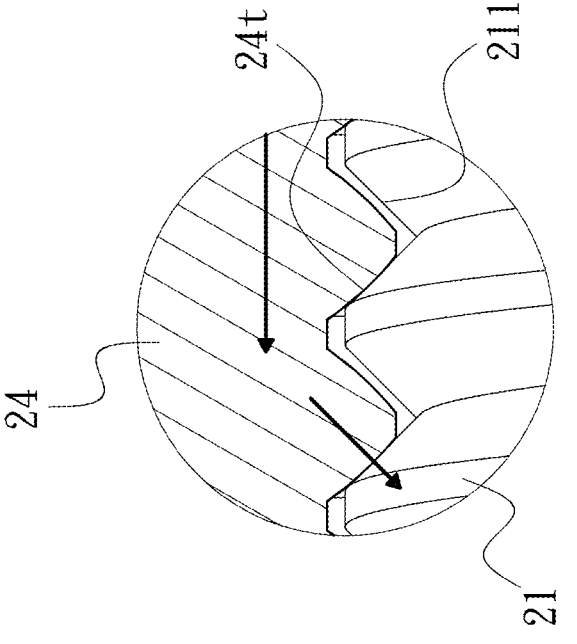

Similarly, as shown in FIGS. 7A and 7B, the preload applied by the elastic protrusions 271 of the right metal spring 27 (see FIG. 5A) is transmitted via the second pointed ends 244 to the second rollers 24. Meanwhile, the second gaps 32 formed between the second locating ends 243 and the left retainer 26 allow the second rollers 24 to be pushed leftward by the elastic protrusions 271 of the right metal spring 27. In this manner, the annular teeth 24t are moved to contact a right side of the thread structure 211 of the screw 21 and a right side of the annular grooves 221g of the nut 22, such that the second rollers 24 are in stable rolling engagement with the screw 21 and the nut 22 without skidding and idling between the screw 21 and the nut 22.

In the present invention, two preload maintaining units K are provided at two ends of the roller unit R to guide the axial preloads to the accurate transmission paths, such that the elastic protrusions 271 on the left and the right metal spring 27 only act on the first and the second rollers 23, 24, respectively, and two directionally opposite positive preloads are applied to the first and the second rollers 23, 24. With this design, it can be sure that all the first and the second rollers 23, 24 are in tight contact with corresponding rolling contact surfaces of the screw 21 and the nut 22, and it is possible to overcome any gap formed by manufacturing tolerance to thereby effectively achieve not only reduced sliding friction and backlash, but also upgraded rolling stability, overall transmission accuracy, and extended system service life.

In conclusion, the roller screw bidirectional and alternated preloading structure with built-in metal springs according to the present invention includes a roller unit R and two preload maintaining units K provided at two ends of the roller unit R. The preload maintaining units K respectively include a metal spring 27 provided with a plurality of elastic protrusions 271; first gaps 31 are formed between the right metal spring 27, 27a and the first rollers 23, and second gaps 32 are formed between the left metal spring 27, 27a and the second rollers 24; and the first gaps 31 and the second gaps 32 are alternately arranged around the screw 21, such that the left and the right metal spring 27, 27a can apply two directionally opposite preloads on the first and the second rollers 23, 24, respectively, to achieve the bidirectional and alternated preloading structure of the present invention. The structure of the present invention not only effectively compensates any gap formed between the roller unit R and the screw 21 and the nut 22 due to machining tolerance and eliminates any initial backlash, but also enables the first and the second rollers 23, 24 to have stable motion paths and always keep a pure rolling state, and thereby effectively prevents the rollers 23, 24 from skidding or idling between the screw 21 and the nut 22.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A roller screw bidirectional and alternated preloading structure with built-in metal springs, comprising:
   a screw having a thread structure provided on an outer surface thereof;
   a nut being fitted around the screw and having at least one annular grooved zone and two limiting grooves provided on an inner wall surface thereof;
   a roller unit being fitted in the nut and located between the screw and the nut; the roller unit including a plurality of first rollers and a plurality of second rollers, and the first and the second rollers being alternately arranged around the screw; the first rollers respectively having a first locating end and a first pointed end, and the second rollers respectively having a second locating end axially located opposite to the first locating end and a second pointed end axially located opposite to the first pointed end; and the first and second rollers respectively having annular teeth provided on around an outer surface thereof for meshing with the thread structure on the screw and the at least one annular grooved zone in the nut;
   two preload maintaining units being provided in the nut at two axially outer ends of the roller unit; each of the preload maintaining units including a retainer and a metal spring; the retainer of a left one of the two preload maintaining units having a plurality of retaining holes provided thereon for receiving the first locating ends, and the retainer of a right one of the two preload maintaining units having a plurality of retaining holes provided thereon for receiving the second locating ends; each of the metal springs being located between the roller unit and an axially inner side of one corresponding retainer; each of the metal springs being formed with a plurality of elastic protrusions, which are circumferentially spaced along and radially inward extended from an inner sidewall surface of the metal spring to axially tilt toward the roller unit; the elastic protrusions being located radially offset from the retaining holes; and the elastic protrusions on the right and the left metal spring being elastically pressed against the first pointed ends and the second pointed ends, respectively; and a retaining unit including two retaining members located at two axially outer sides of the two preload maintaining units; and the two retaining members being fitted in the two limiting grooves in the nut to prevent the two preload maintaining units from axially moving out of the nut; and wherein, with the elastic protrusions being arranged radially offset from the retaining holes, the first pointed ends and the second pointed ends are pressed against the elastic protrusions to cause elastic deformation of the elastic protrusions, while a first gap is formed between each first locating end and a bottom of the corresponding retaining hole and a second gap is formed between each second locating end and a bottom of the corresponding retaining hole; such that two directionally opposite axial preloads are applied by the elastic protrusions of the left and the right metal spring and transmitted via the first and the second pointed ends to the first and the second rollers, respectively, and accordingly, the two axially opposite preloads are alternately applied from two directions; and this arrangement enables reduced backlash between the screw and the nut and pure rolling contact of the rollers with the screw and the nut.

2. The roller screw bidirectional and alternated preloading structure with built-in metal springs as claimed in claim 1, wherein the retainers respectively include a plurality fitting recesses, and the metal springs are respectively a loop-shaped leaf spring having a plurality of fitting legs spaced along an outer periphery thereof for correspondingly engaging with the fitting recesses, such that the metal springs are removably assembled to the retainers.

3. The roller screw bidirectional and alternated preloading structure with built-in metal springs as claimed in claim 1, wherein the elastic protrusions of the metal springs are respectively provided with a recess; the first pointed ends being located corresponding to the recesses formed on the left metal spring, and the second pointed ends being located corresponding to the recesses formed on the right metal spring.

4. The roller screw bidirectional and alternated preloading structure with built-in metal springs as claimed in claim 3, wherein the recesses are selected from the group consisting of concave recesses; and the first and the second pointed ends being conic ends in point contact with the recesses.

5. The roller screw bidirectional and alternated preloading structure with built-in metal springs as claimed in claim 1, wherein the elastic protrusions are circumferentially spaced from each other and are axially tilted when they are not subjected to any external force.

* * * * *